United States Patent
Gaffga et al.

(10) Patent No.: US 8,135,659 B2
(45) Date of Patent: Mar. 13, 2012

(54) SYSTEM CONFIGURATION COMPARISON TO IDENTIFY PROCESS VARIATION

(75) Inventors: Joachim Gaffga, Wiesloch (DE); Juergen Sattler, Wiesloch (DE); Frank Markert, Grossostheim (DE); Robert Viehmann, Waghausl (DE); Werner Wolf, Wiesloch (DE)

(73) Assignee: SAP AG, Walldorf (DE)

( * ) Notice: Subject to any disclaimer, the term of this patent is extended or adjusted under 35 U.S.C. 154(b) by 631 days.

(21) Appl. No.: 12/243,827

(22) Filed: Oct. 1, 2008

(65) Prior Publication Data

US 2010/0082518 A1    Apr. 1, 2010

(51) Int. Cl.
G06F 17/00    (2006.01)

(52) U.S. Cl. ......................................................... 706/47

(58) Field of Classification Search ...................... 706/47
See application file for complete search history.

(56) References Cited

U.S. PATENT DOCUMENTS

| | | |
|---|---|---|
| 4,079,452 A | 3/1978 | Larson et al. |
| 4,501,528 A | 2/1985 | Knapp |
| 5,307,499 A | 4/1994 | Yin |
| 5,428,791 A | 6/1995 | Andrew |
| 5,459,868 A | 10/1995 | Fong |
| 5,647,056 A | 7/1997 | Barrett et al. |
| 5,657,448 A | 8/1997 | Wadsworth et al. |
| 5,680,624 A | 10/1997 | Ross |
| 5,754,845 A | 5/1998 | White |
| 5,758,062 A | 5/1998 | McMahon et al. |
| 5,857,102 A | 1/1999 | McChesney et al. |
| 5,978,579 A | 11/1999 | Buxton et al. |
| 6,006,035 A | 12/1999 | Nabahi |
| 6,044,461 A | 3/2000 | Agha et al. |
| 6,067,525 A | 5/2000 | Johnson et al. |
| 6,128,730 A | 10/2000 | Levine |
| 6,161,123 A | 12/2000 | Renouard et al. |
| 6,161,176 A | 12/2000 | Hunter et al. |
| 6,185,587 B1 | 2/2001 | Bernardo et al. |
| 6,189,139 B1 | 2/2001 | Ladd |
| 6,230,305 B1 | 5/2001 | Meares |
| 6,301,710 B1 | 10/2001 | Fujiwara |

(Continued)

FOREIGN PATENT DOCUMENTS

JP    2004287972 A    10/2004

(Continued)

OTHER PUBLICATIONS

A novel approach for proper name transliteration verification, Ea-Ee Jan; Niyu Ge; Shih-Hsiang Lin; Roukos, S.; Sorensen, J.; Chinese Spoken Language Processing (ISCSLP), 2010 7th International Symposium on Digital Object Identifier: 10.1109/ISCSLP.2010. 5684842 Publication Year: 2010 , pp. 89-94.*

(Continued)

*Primary Examiner* — Michael B Holmes
(74) *Attorney, Agent, or Firm* — Schwegman, Lundberg & Woessner, P.A.

(57) ABSTRACT

The present subject mater relates computer system configuration and, more particularly, to system configuration comparison to identify process variation. Various embodiments described herein include one or more of systems, methods, software, and data structures to retrieve configuration information from a first system and a second system, apply a set of rules to the configuration information to identify process variants implemented in each of the first and second systems, and output a representation of process variant implementation differences between the first and second systems.

20 Claims, 8 Drawing Sheets

U.S. PATENT DOCUMENTS

| | | |
|---|---|---|
| 6,321,282 B1 * | 11/2001 | Horowitz et al. ............ 710/104 |
| 6,324,578 B1 | 11/2001 | Cox et al. |
| 6,397,232 B1 | 5/2002 | Cheng-Hung et al. |
| 6,449,624 B1 | 9/2002 | Hammack et al. |
| 6,453,302 B1 | 9/2002 | Johnson et al. |
| 6,466,972 B1 | 10/2002 | Paul et al. |
| 6,470,464 B2 | 10/2002 | Bertram et al. |
| 6,513,045 B1 | 1/2003 | Casey et al. |
| 6,523,027 B1 | 2/2003 | Underwood |
| 6,538,668 B1 | 3/2003 | Ruberg et al. |
| 6,539,372 B1 | 3/2003 | Casey et al. |
| 6,728,877 B2 | 4/2004 | Mackin et al. |
| 6,763,327 B1 | 7/2004 | Songer et al. |
| 6,804,709 B2 | 10/2004 | Manjure et al. |
| 6,810,401 B1 | 10/2004 | Thompson et al. |
| 6,868,392 B1 | 3/2005 | Ogasawara |
| 7,031,951 B2 | 4/2006 | Mancisidor et al. |
| 7,032,114 B1 | 4/2006 | Moran |
| 7,051,130 B1 * | 5/2006 | Horowitz et al. ............ 710/104 |
| 7,062,502 B1 | 6/2006 | Kesler |
| 7,089,317 B2 | 8/2006 | Jeyaraman et al. |
| 7,099,945 B2 | 8/2006 | Lugger et al. |
| 7,174,400 B2 * | 2/2007 | Horowitz et al. ............ 710/104 |
| 7,181,731 B2 | 2/2007 | Pace et al. |
| 7,206,827 B2 | 4/2007 | Viswanath et al. |
| 7,209,851 B2 | 4/2007 | Singh et al. |
| 7,228,326 B2 | 6/2007 | Srinivasan et al. |
| 7,283,816 B2 | 10/2007 | Fok et al. |
| 7,299,382 B2 | 11/2007 | Jorapur |
| 7,305,659 B2 | 12/2007 | Muller et al. |
| 7,337,317 B2 | 2/2008 | Meggitt et al. |
| 7,340,411 B2 | 3/2008 | Cook |
| 7,346,766 B2 | 3/2008 | Mackin et al. |
| 7,360,211 B2 | 4/2008 | Hyden et al. |
| 7,376,682 B2 | 5/2008 | Ramacher et al. |
| 7,379,455 B2 | 5/2008 | Pickett |
| 7,412,497 B2 | 8/2008 | Viswanath et al. |
| 7,421,621 B1 | 9/2008 | Zambrana et al. |
| 7,426,694 B2 | 9/2008 | Gross et al. |
| 7,451,451 B2 | 11/2008 | Schaefer |
| 7,487,231 B2 | 2/2009 | Brown et al. |
| 7,519,964 B1 | 4/2009 | Islam et al. |
| 7,526,457 B2 | 4/2009 | Duevel et al. |
| 7,540,014 B2 | 5/2009 | Vasishth et al. |
| 7,546,390 B2 * | 6/2009 | Horowitz et al. ............... 710/16 |
| 7,590,669 B2 | 9/2009 | Yip et al. |
| 7,593,124 B1 | 9/2009 | Sheng et al. |
| 7,599,895 B2 | 10/2009 | Nugent |
| 7,603,452 B1 | 10/2009 | Guo |
| 7,606,840 B2 | 10/2009 | Malik |
| 7,609,651 B1 | 10/2009 | McBride et al. |
| 7,610,582 B2 | 10/2009 | Becker et al. |
| 7,617,256 B2 | 11/2009 | Mohamed et al. |
| 7,640,542 B2 | 12/2009 | Herenyi et al. |
| 7,644,432 B2 | 1/2010 | Patrick et al. |
| 7,657,887 B2 | 2/2010 | Kothandaraman et al. |
| 7,665,082 B2 | 2/2010 | Wyatt et al. |
| 7,685,577 B2 | 3/2010 | Pace et al. |
| 7,694,181 B2 | 4/2010 | Noller et al. |
| 7,702,897 B2 | 4/2010 | Reed et al. |
| 7,716,634 B2 | 5/2010 | Ross et al. |
| 7,725,200 B2 | 5/2010 | Reed et al. |
| 7,725,877 B2 | 5/2010 | Andrade et al. |
| 7,739,657 B2 | 6/2010 | Rolfs |
| 7,823,124 B2 * | 10/2010 | Sattler et al. .................. 717/117 |
| 7,827,528 B2 * | 11/2010 | Sattler et al. .................. 717/121 |
| 7,831,568 B2 * | 11/2010 | Sattler et al. .................. 707/674 |
| 7,831,637 B2 * | 11/2010 | Sattler et al. .................. 707/805 |
| 7,908,589 B2 * | 3/2011 | Sattler et al. .................. 717/121 |
| 7,912,800 B2 * | 3/2011 | Sattler et al. .................... 706/46 |
| 2001/0044834 A1 | 11/2001 | Bradshaw et al. |
| 2001/0054091 A1 | 12/2001 | Lenz et al. |
| 2002/0026572 A1 | 2/2002 | Joory |
| 2002/0095663 A1 | 7/2002 | Joory |
| 2002/0099578 A1 | 7/2002 | Eicher et al. |
| 2002/0104097 A1 | 8/2002 | Jerding et al. |
| 2002/0116373 A1 | 8/2002 | Nishikawa et al. |
| 2002/0138570 A1 | 9/2002 | Hickey |
| 2002/0147784 A1 | 10/2002 | Gold et al. |
| 2002/0156947 A1 | 10/2002 | Nishio |
| 2002/0188625 A1 | 12/2002 | Jans et al. |
| 2003/0005411 A1 | 1/2003 | Gerken |
| 2003/0023963 A1 | 1/2003 | Birkholz et al. |
| 2003/0115292 A1 | 6/2003 | Griffin et al. |
| 2003/0120780 A1 | 6/2003 | Zhu et al. |
| 2003/0135842 A1 | 7/2003 | Frey et al. |
| 2003/0227392 A1 | 12/2003 | Ebert et al. |
| 2003/0237093 A1 | 12/2003 | Marsh |
| 2004/0019669 A1 | 1/2004 | Viswanath et al. |
| 2004/0019670 A1 | 1/2004 | Viswanath et al. |
| 2004/0031030 A1 | 2/2004 | Kidder et al. |
| 2004/0060047 A1 | 3/2004 | Talati et al. |
| 2004/0088691 A1 | 5/2004 | Hammes et al. |
| 2004/0111417 A1 | 6/2004 | Goto et al. |
| 2004/0176996 A1 | 9/2004 | Powers et al. |
| 2004/0186927 A1 | 9/2004 | Eryurek et al. |
| 2004/0268342 A1 | 12/2004 | Hyden et al. |
| 2005/0007964 A1 | 1/2005 | Falco et al. |
| 2005/0044215 A1 | 2/2005 | Cohen et al. |
| 2005/0044546 A1 | 2/2005 | Niebling et al. |
| 2005/0080801 A1 | 4/2005 | Kothandaraman et al. |
| 2005/0086195 A1 | 4/2005 | Tan et al. |
| 2005/0108219 A1 | 5/2005 | De La Huerga |
| 2005/0108707 A1 | 5/2005 | Taylor et al. |
| 2005/0138558 A1 | 6/2005 | Duevel et al. |
| 2005/0144474 A1 | 6/2005 | Takala et al. |
| 2005/0160419 A1 | 7/2005 | Alam et al. |
| 2005/0188422 A1 | 8/2005 | Jooste |
| 2005/0193103 A1 | 9/2005 | Drabik |
| 2005/0262076 A1 | 11/2005 | Voskuil |
| 2005/0262499 A1 | 11/2005 | Read |
| 2005/0268282 A1 | 12/2005 | Laird |
| 2005/0278202 A1 | 12/2005 | Broomhall et al. |
| 2005/0278280 A1 | 12/2005 | Semerdzhiev et al. |
| 2006/0037000 A1 | 2/2006 | Speeter et al. |
| 2006/0047793 A1 | 3/2006 | Agrawal et al. |
| 2006/0173857 A1 | 8/2006 | Jackson |
| 2006/0184917 A1 | 8/2006 | Troan et al. |
| 2006/0184926 A1 | 8/2006 | Or et al. |
| 2006/0224637 A1 | 10/2006 | Wald |
| 2006/0234698 A1 | 10/2006 | Fok et al. |
| 2006/0242697 A1 | 10/2006 | Takemura |
| 2006/0248450 A1 | 11/2006 | Wittenberg et al. |
| 2006/0253588 A1 | 11/2006 | Gao et al. |
| 2007/0006161 A1 | 1/2007 | Kuester et al. |
| 2007/0016591 A1 | 1/2007 | Beadles et al. |
| 2007/0022323 A1 | 1/2007 | Loh et al. |
| 2007/0025704 A1 | 2/2007 | Tsukazaki et al. |
| 2007/0074203 A1 | 3/2007 | Curtis et al. |
| 2007/0079289 A1 | 4/2007 | MacCaux et al. |
| 2007/0079291 A1 | 4/2007 | Roth |
| 2007/0093926 A1 | 4/2007 | D. Braun et al. |
| 2007/0097975 A1 | 5/2007 | Rakers et al. |
| 2007/0157185 A1 | 7/2007 | Semerdzhiev et al. |
| 2007/0157192 A1 | 7/2007 | Hoefler et al. |
| 2007/0168065 A1 | 7/2007 | Nixon et al. |
| 2007/0168971 A1 | 7/2007 | Royzen et al. |
| 2007/0198437 A1 | 8/2007 | Eisner et al. |
| 2007/0234274 A1 | 10/2007 | Ross et al. |
| 2007/0234293 A1 | 10/2007 | Noller et al. |
| 2007/0257715 A1 | 11/2007 | Semerdzhiev et al. |
| 2008/0059474 A1 | 3/2008 | Lim |
| 2008/0059490 A1 | 3/2008 | Sattler et al. |
| 2008/0059537 A1 | 3/2008 | Sattler et al. |
| 2008/0059630 A1 | 3/2008 | Sattler et al. |
| 2008/0071555 A1 | 3/2008 | Sattler et al. |
| 2008/0071718 A1 | 3/2008 | Sattler et al. |
| 2008/0071828 A1 | 3/2008 | Sattler et al. |
| 2008/0071839 A1 | 3/2008 | Sattler et al. |
| 2008/0082517 A1 | 4/2008 | Sattler et al. |
| 2008/0126375 A1 | 5/2008 | Sattler et al. |
| 2008/0126448 A1 | 5/2008 | Sattler et al. |
| 2008/0127082 A1 | 5/2008 | Birimisa et al. |
| 2008/0127084 A1 | 5/2008 | Sattler et al. |
| 2008/0127085 A1 | 5/2008 | Sattler et al. |
| 2008/0127086 A1 | 5/2008 | Sattler et al. |
| 2008/0127123 A1 | 5/2008 | Sattler et al. |

| | | | |
|---|---|---|---|
| 2008/0195579 | A1 | 8/2008 | Kennis et al. |
| 2009/0024990 | A1 | 1/2009 | Singh et al. |
| 2009/0157455 | A1 | 6/2009 | Kuo et al. |
| 2009/0193439 | A1 | 7/2009 | Bernebeu-Auban et al. |
| 2009/0300416 | A1 | 12/2009 | Watanabe et al. |
| 2010/0153443 | A1 | 6/2010 | Gaffga et al. |
| 2010/0153468 | A1 | 6/2010 | Lange et al. |
| 2010/0192135 | A1 | 7/2010 | Krishnaswamy et al. |
| 2011/0035629 | A1 | 2/2011 | Noller et al. |

FOREIGN PATENT DOCUMENTS

| | | |
|---|---|---|
| WO | WO-2004114130 A2 | 12/2004 |
| WO | WO-2005045670 A1 | 5/2005 |

OTHER PUBLICATIONS

An initial investigation of L1 and L2 discourse speech planning in English, Chiu-Yu Tseng; Zhao-Yu Su; Chi-Feng Huang; Visceglia, T.; Chinese Spoken Language Processing (ISCSLP), 2010 7th International Symposium on Digital Object Identifier: 10.1109/ISCSLP.2010.5684851 Publication Year: 2010 , pp. 55-59.*

Analysis of TCP-Reno and TCP-Vegas over AOMDV routing protocol for mobile ad hoc network, Othman, M.; Oo, M.Z.; Advanced Communication Technology (ICACT), 2010 The 12th International Conference on vol. 2 Publication Year: 2010 , pp. 1104-1108.*

"U.S. Appl. No. 11/512,517, Response to Non-Final Office Action mailed Jan. 29, 2009", 16 pgs.

"U.S. Appl. No. 11/512,609, Final Office Action mailed Dec. 8, 2008", 12 pgs.

"U.S. Appl. No. 11/512,884, Final Office Action mailed Dec. 19, 2008", 11 pgs.

"U.S. Appl. No. 11/512,886, Non-Final Office Action mailed Dec. 26, 2008", 10 pgs.

"U.S. Appl. No. 11/512,440, Notice of Allowance mailed Dec. 12, 2010.", 14 pgs.

"U.S. Appl. No. 11/512,440, Response filed Oct. 18, 2010 to Non Final Office Action mailed Jun. 17, 2010", 11 pgs.

"U.S. Appl. No. 11/512,441, Final Office Action mailed Dec. 1, 2010", 7 pgs.

"U.S. Appl. No. 11/512,441, Non Final Office Action mailed Mar. 23, 2011", 9 pgs.

"U.S. Appl. No. 11/512,441, Response filed Mar. 1, 2011 to Final Office Action mailed Mar. 1, 2010", 8 pgs.

"U.S. Appl. No. 11/512,441, Response filed Sep. 21, 2010 to Non Final Office Action mailed Jun. 21, 2010", 8 pgs.

"U.S. Appl. No. 11/512,442, Non Final Office Action mailed Feb. 7, 2011", 14 pgs.

"U.S. Appl. No. 11/512,443, Notice of Allowance mailed Sep. 21, 2010", 17 pgs.

"U.S. Appl. No. 11/512,457, Notice of Allowance mailed Aug. 13, 2010", 13 pgs.

"U.S. Appl. No. 11/512,457, Notice of Allowance mailed Sep. 17, 2010", 7 pgs.

"U.S. Appl. No. 11/512,457, Response filed Aug. 5, 2010 to Non Final Office Action mailed May 13, 2010", 10 pgs.

"U.S. Appl. No. 11/512,516 Non-Final Office Action mailed Jul. 8, 2010", 20 pgs.

"U.S. Appl. No. 11/512,516, Final Office Action mailed Dec. 22, 2010", 23 pgs.

"U.S. Appl. No. 11/512,516, Response filed Oct. 8, 2010 to Non Final Office Action mailed Jul. 8, 2010", 11 pgs.

"U.S. Appl. No. 11/512,517, Non-Final Office Action mailed Aug. 16, 2010", 30 pgs.

"U.S. Appl. No. 11/512,517, Notice of Allowance mailed Feb. 8, 2011", 10 pgs.

"U.S. Appl. No. 11/512,517, Response filed Nov. 16, 2010 to Non Final Office Action mailed Aug. 16, 2010", 8 pgs.

"U.S. Appl. No. 11/512,518 Final Office Action mailed Oct. 15, 2010", 15 pgs.

"U.S. Appl. No. 11/512,518, Response filed Aug. 24, 2010 to Non Final Office Action mailed May 27, 2010", 10 pgs.

"U.S. Appl. No. 11/512,520 Notice of Allowance mailed Sep. 29, 2010", 6 pgs.

"U.S. Appl. No. 11/512,608 Notice of Allowance mailed Sep. 8, 2010", 8 pgs.

"U.S. Appl. No. 11/512,608, Notice of Allowance mailed Aug. 13, 2010", 9 pgs.

"U.S. Appl. No. 11/512,608, Response filed Aug. 5, 2010 to Non Final Office Action mailed May 12, 2010", 10 pgs.

"U.S. Appl. No. 12/332,513, Non Final Office Action mailed Mar. 28, 2011", 20 pgs.

"U.S. Appl. No. 12/336,931, Non Final Office Action mailed Mar. 14, 2011", 11 pgs.

Brown, Wanda Jones, et al., ""Configuration Management Plan for the Science Data Processing System"", Upper Marlboro, Maryland, (Apr. 2001).

Dotoli, et al., "A decision support system for the supply chain configuration", IEEE, (Oct. 8, 2003), 6 pgs.

Ganguly, et al., "Reducing Complexity of Software Deployment with Delta Configuration", IEEE, (May 21, 2007), 729-732.

Gu, Mingyang, et al., "Component Retrieval Using Conversational Case-Base Reasoning", IEA/AIE, Annecy, France, (Jun. 27-30, 2006), 12 pgs.

Kahl, Fredrik, et al., "Critical configurations for n-view projective reconstruction", IEEE, (Dec. 14, 2001), 6 pgs.

Park, Young, "Software retrieval by samples using concept analysis", Journal of Systems and Software 54, (2000), 179-183.

Sloane, et al., "Modeling Deployment and Configuration of Cobra Systems with UML", IEEE, (2000), 778.

Virgilo, "A Rule-based Approach to Content Delivery Adaptation in Web Information Systems", Proc. 7th International Conference on Mobile Data Management, IEEE, (May 12, 2006), 4 pgs.

Ying Li, et al., "Modeling and Verifying Configuration in Service Deployment", IEEE, (2006), 8 pgs.

"U.S. Appl. No. 11/512,442, Final Office Action mailed Apr. 21, 2010", 13 pgs.

"U.S. Appl. No. 11/512,442, Response filed Jan. 4, 2010 to Non Final Office Action mailed Oct. 1, 2009", 10 pgs.

"U.S. Appl. No. 11/512,443, Final Office Action mailed Jan. 22, 2010", 14 pgs.

"U.S. Appl. No. 11/512,443, Response filed Apr. 22, 2010 to Final Office Action mailed Jan. 22, 2010", 12 pgs.

"U.S. Appl. No. 11/512,457, Non-Final Office Action mailed May 13, 2010", 11 pgs.

"U.S. Appl. No. 11/512,516, Final Office Action mailed May 5, 2010", 16 pgs.

"U.S. Appl. No. 11/512,516, Response filed Apr. 30, 2010 to Final Office Action mailed Mar. 5, 2010", 9 pgs.

"U.S. Appl. No. 11/512,517, Examiner Interview Summary mailed Dec. 24, 2009", 3 pgs.

"U.S. Appl. No. 11/512,517, Notice of Allowance mailed Jan. 21, 2010", 8 pgs.

"U.S. Appl. No. 11/512,517, Response filed Dec. 14, 2009 to Non Final Office Action mailed Sep. 16, 2009", 8 pgs.

"U.S. Appl. No. 11/512,520, Notice of Allowance mailed Jan. 25, 2010", 6 pgs.

"U.S. Appl. No. 11/512,608, Non-Final Office Action mailed May 12, 2010", 12 pgs.

"U.S. Appl. No. 11/512,609, Final Office Action mailed Nov. 20, 2009", 15 pgs.

"U.S. Appl. No. 11/512,886, Notice of Allowance mailed Dec. 24, 2009", 8 pgs.

"European Application Serial No. 09012347.2, Extended European Search Report mailed Nov. 26, 2009", 5 pgs.

Krintz, Chandra J., ""Reducing load delay to improve performance of Internet-computing programs"", *University of California*, San Diego, (2001), 225 pgs.

"U.S. Appl. No. 11/511,357 Non-Final Office Action mailed Jul. 2, 2010", 11 pgs.

"U.S. Appl. No. 11/512,441, Non-Final Office Action mailed Jun. 21, 2010", 8 pgs.

"U.S. Appl. No. 11/512,442, Response filed Jun. 21, 2010 to Final Office Action mailed Apr. 21, 2010", 9 pgs.

"U.S. Appl. No. 11/512,518, Non-Final Office Action mailed May 27, 2010", 14 pgs.

"U.S. Appl. No. 11/512,520, Notice of Allowance mailed Jun. 15, 2010", 6 pgs.

"U.S. Appl. No. 11/512,440, Non-Final Office Action mailed Jun. 17, 2010", 14 pgs.

Bellissard, Luc, et al., "Component-based Programming and Application Management with Olan, Proceedings of Workshop on Distributed Computing", Retrieved on [Jun. 15, 2010] Retrieved from the Internet:URL<http://www.springerl ink.com/contenUf2g8rl4083393124/fu litext. pdf>, (1995).

Hwang, Jeong Hee, et al., "Context Based Recommendation Service in Ubiquitous Commerce", Database Laboratory, Chungbuk National University, Korea, Springer-Verlag Berlin Heidelberg,, (2005).

"U.S. Appl. No. 11/512,442, Non Final Office Action mailed Oct. 1, 2009", 15 pgs.

"U.S. Appl. No. 11/512,443, Examiner Interview Summary mailed Oct. 7, 2009", 4 pgs.

"U.S. Appl. No. 11/512,443, Final Office Action mailed Feb. 6, 2009", 20 pgs.

"U.S. Appl. No. 11/512,443, Non-Final Office Action mailed Jun. 26, 2009", 11 pgs.

"U.S. Appl. No. 11/512,443, Response filed Apr. 3, 2009 to Final Office Action mailed Feb. 6, 2009", 13 pgs.

"U.S. Appl. No. 11/512,443, Response filed Sep. 28, 2009 to Non Final Office Action mailed Jun. 26, 2009", 16 pgs.

"U.S. Appl. No. 11/512,516, Non-Final Office Action mailed Feb. 4, 2009", 12 pgs.

"U.S. Appl. No. 11/512,516, Non-Final Office Action mailed Jul. 10, 2009", 15 pgs.

"U.S. Appl. No. 11/512,516, Response filed Apr. 28, 2009 to Non Final Office Action mailed Feb. 4, 2009", 16 pgs.

"U.S. Appl. No. 11/512,516, Response filed Oct. 9, 2009 to Non Final Office Action mailed Jul. 10, 2009", 9 pgs.

"U.S. Appl. No. 11/512,517, Non-Final Office Action mailed Sep. 16, 2009", 16 pgs.

"U.S. Appl. No. 11/512,517, Notice of Allowance mailed Apr. 3, 2009", 10 pgs.

"U.S. Appl. No. 11/512,519, Final Office Action mailed Feb. 2, 2009", 14 pgs.

"U.S. Appl. No. 11/512,520, Non-Final Office Action mailed Jul. 22, 2009", 14 pgs.

"U.S. Appl. No. 11/512,520, Response filed Oct. 22, 2009 to Non Final Office Action mailed Jul. 22, 2009", 13 pgs.

"U.S. Appl. No. 11/512,609, Non Final Office Action mailed Apr. 27, 2009", 15 pgs.

"U.S. Appl. No. 11/512,609, Response filed Feb. 17, 2009 to Final Office Action mailed Dec. 8, 2008", 10 pgs.

"U.S. Appl. No. 11/512,609, Response filed Jul. 24, 2009 to Non Final Office Action mailed Apr. 27, 2009", 11 pgs.

"U.S. Appl. No. 11/512,886, Examiner Interview Summary mailed Sep. 29, 2009", 2 pgs.

"U.S. Appl. No. 11/512,886, Final Office Action mailed Jun. 24, 2009", 11 pgs.

"U.S. Appl. No. 11/512,886, Response filed Mar. 25, 2009 to Non Final Office Action mailed Dec. 26, 2008", 9 pgs.

"U.S. Appl. No. 11/512,886, Response filed Sep. 22, 2009 to Final Office Action mailed Jun. 24, 2009", 10 pgs.

"U.S. Appl. No. 11/512,443, Response filed Oct. 9, 2008 to Non-Final Office Action mailed Jul. 9, 2008", 11 pgs.

"U.S. Appl. No. 11/512,443, Non-Final Office Action mailed Jul. 9, 2008", 17 pgs.

"U.S. Appl. No. 11/512,517, Non-Final Office Action mailed Oct. 29, 2008", 13 pgs.

"U.S. Appl. No. 11/512,519 response filed Nov. 11, 2008 to Non-Final Office Action mailed Sep. 11, 2008", 15 pgs.

"U.S. Appl. No. 11/512,519, Non-FinalOffice Action mailed Sep. 11, 2008", 14 pgs.

"U.S. Appl. No. 11/512,609, Non Final Office Action mailed on Jun. 19, 2008", 9 pgs.

"U.S. Appl. No. 11/512,609, Response filed Sep. 19, 2008 to Non-Final Office Action mailed Jun. 19, 2008", 8 pgs.

"U.S. Appl. No. 11/512,884, Non-Final Office Action Mailed Jul. 29, 2008", 12 pgs.

"U.S. Appl. No. 11/512884, Response filed Sep. 23, 2008 to Non-Final Office Action mailed Jun. 29, 2008", 17 pgs.

"International Application Serial No. PCT/EP2007/007460, International Search Report Nov. 2, 2007", 5 pgs.

"International Application Serial No. PCT/EP2007/007460, Written Opinion Nov. 2, 2007", 7 pgs.

"International Application Serial No. PCT/EP2007/007461. International Search Report Nov. 26, 2007", 7 pgs.

"International Application Serial No. PCT/EP2007/007461, International Search Report mailed Feb. 5, 2008", 8 pgs.

"International Application Serial No. PCT/EP2007/007461, Written Opinion mailed Feb. 5, 2008", 9 pgs.

"International Application Serial No. PCT/EP2007/007462, International Search Report Mailed Mar. 17, 2008", 7 pgs.

"International Application Serial No. PCT/EP2007/007462, Partial International Search Report mailed Dec. 27, 2007", 8 pgs.

"International Application Serial No. PCT/EP2007/007462, Written Opinion Mailed Mar. 17, 2008", 8 pgs.

"International Application Serial No. PCT/EP2007/007490, International Search Report Oct. 26, 2007", 4 pgs.

"International Application Serial No. PCT/EP2007/007490, International Search Report mailed Jan. 24, 2008", 7 pgs.

"International Application Serial No. PCT/EP2007/007490, Written Opinion mailed Jan. 24, 2008", 9 pgs.

"International Application Serial No. PCT/EP2007/007491, International Search Report Oct. 22, 2007", 5 pgs.

"International Application Serial No. PCT/EP2007/007491, Written Opinion Oct. 22, 2007", 6 pgs.

"International Application Serial No. PCT/EP2007/007515, International Search Report Nov. 12, 2007", 8 pgs.

"International Application Serial No. PCT/EP2007/007515, International Search Report mailed Jan. 24, 2008", 8 pgs.

"International Application Serial No. PCT/EP2007/007515, Written Opinion mailed Jan. 24, 2008", 12 pgs.

Indigorose, "Setup Factory", *User's Guide IndigoRose Software Design No. 2*, (Mar. 1998), 82 pgs.

Liu, et al., "A Knowledge-Based Approach to Requirements Analysis", (1995).

"U.S. Appl. No. 11/512,440, Notice of Allowance mailed Nov. 12, 2010.", 14 pgs.

"U.S. Appl. No. 11/512,440, Response filed Oct. 18, 2010 to Non Final Office Action mailed Jun. 17, 2010", 11 pgs.

"U.S. Appl. No. 11/512,441, Final Office Action mailed Dec. 1, 2010", 7 pgs.

"U.S. Appl. No. 11/512,441, Non Final Office Action mailed Mar. 23, 2011", 9 pgs.

"U.S. Appl. No. 11/512,441, Notice of Allowance mailed Jul. 19, 2011", 13 pgs.

"U.S. Appl. No. 11/512,441, Response filed Mar. 1, 2011 to Final Office Action mailed Dec. 1, 2010", 8 pgs.

"U.S. Appl. No. 11/512,441, Response filed Sep. 21, 2010 to Non Final Office Action mailed Jun. 21, 2010", 8 pgs.

"U.S. Appl. No. 11/512,442, Non Final Office Action mailed Feb. 7, 2011", 14 pgs.

"U.S. Appl. No. 11/512,443, Notice of Allowance mailed Sep. 21, 2010", 17 pgs.

"U.S. Appl. No. 11/512,457, Notice of Allowance mailed Aug. 13, 2010", 13 pgs.

"U.S. Appl. No. 11/512,457, Notice of Allowance mailed Sep. 17, 2010", 7 pgs.

"U.S. Appl. No. 11/512,457, Response filed Aug. 5, 2010 to Non Final Office Action mailed May 13, 2010", 10 pgs.

"U.S. Appl. No. 11/512,516 Non-Final Office Action mailed Jul. 8, 2010", 20 pgs.

"U.S. Appl. No. 11/512,516, Final Office Action mailed Dec. 22, 2010", 23 pgs.

"U.S. Appl. No. 11/512,516, Response filed Oct. 8, 2010 to Non Final Office Action mailed Jul. 8, 2010", 11 pgs.

"U.S. Appl. No. 11/512,517, Non-Final Office Action mailed Aug. 16, 2010", 30 pgs.

"U.S. Appl. No. 11/512,517, Notice of Allowance mailed Feb. 8, 2011", 10 pgs.

"U.S. Appl. No. 11/512,517, Response filed Nov. 16, 2010 to Non Final Office Action mailed Aug. 16, 2010", 8 pgs.

"U.S. Appl. No. 11/512,518 Final Office Action mailed Oct. 15, 2010", 15 pgs.

"U.S. Appl. No. 11/512,518, Response filed Aug. 24, 2010 to Non Final Office Action mailed May 27, 2010", 10 pgs.

"U.S. Appl. No. 11/512,520 Notice of Allowance mailed Sep. 29, 2010", 6 pgs.

"U.S. Appl. No. 11/512,608 Notice of Allowance mailed Sep. 8, 2010", 8 pgs.

"U.S. Appl. No. 11/512,608, Notice of Allowance mailed Aug. 13, 2010", 9 pgs.

" U.S. Appl. No. 11/512,608, Response filed Aug. 5, 2010 to Non Final Office Action mailed May 12, 2010", 10 pgs.

"U.S. Appl. No. 12/332,513, Examiner Interview Summary mailed Mar. 23, 2011", 3 pgs.

"U.S. Appl. No. 12/332,513, Final Office Action mailed Oct. 27, 2011", 20 pgs.

"U.S. Appl. No. 12/332,513, Non Final Office Action mailed Mar. 28, 2011", 20 pgs.

"U.S. Appl. No. 12/332,513, Response filed Jun. 28, 2011 to Non Final Office Action mailed Mar. 28, 2011", 11 pgs.

"U.S. Appl. No. 12/336,931, Final Office Action mailed Aug. 9, 2011", 11 pgs.

"U.S. Appl. No. 12/336,931, Non Final Office Action mailed Mar. 14, 2011", 11 pgs.

"U.S. Appl. No. 12/336,931, Response filed Jun. 14, 2011 to Non Final Office Action mailed Mar. 14, 2011", 10 pgs.

Brown, Wanda Jones, et al., ""Configuration Management Plan for the Science Data Processing System"", Upper Marlboro, Maryland, (Apr. 2001).

Dotoli, et al., "A decision support system for the supply chain configuration", IEEE, (Oct. 8, 2003), 6 pgs.

Ganguly, et al., "Reducing Complexity of Software Deployment with Delta Configuration", IEEE, (May 21, 2007), 729-732.

Gu, Mingyang, et al., "Component Retrieval Using Conversational Case-Base Reasoning", IEA/AIE, Annecy, France, (Jun. 27-30, 2006), 12 pgs.

Kahl, Fredrik, et al., "Critical configurations for n-view projective reconstruction", IEEE, (Dec. 14, 2001), 6 pgs.

Lingamarla, Sridevi, et al., "System for automated validation of embedded software in multiple operating configurations", 14th IEEE International Conference on Automated Software Engineering, 1999., (1999), 323-326.

Park, Young, "Software retrieval by samples using concept analysis", Journal of Systems and Software 54, (2000), 179-183.

Sloane, et al., "Modeling Deployment and Configuration of Cobra Systems with UML", IEEE, (2000), 778.

Virgilo, "A Rule-based Approach to Content Delivery Adaptation in Web Information Systems", Proc. 7th International Conference on Mobile Data Management, IEEE, (May 12, 2006), 4 pgs.

Ying Li, et al., "Modeling and Verifying Configuration in Service Deployment", IEEE, (2006), 8 pgs.

US 7,571,147, 08/2009, Sattler et al. (withdrawn)

US 7,730,006, 06/2010, Wiesloch et al. (withdrawn)

\* cited by examiner

SYSTEM CONFIGURATION COMPARISON TO IDENTIFY PROCESS VARIATION

TECHNICAL FIELD

The present subject mater relates computer system configuration and, more particularly, to system configuration comparison to identify process variation.

BACKGROUND INFORMATION

Configuring large software systems, such as Enterprise Resource Planning ("ERP") systems, typically is a large, complex task. If a comparison of the configuration of one system with the configuration of another system is desired, the comparison can be quite complex and time-consuming due in part to the large number of configuration settings. However, merely comparing configuration settings does not necessarily give a true picture of differences between system configurations. There are often settings that do not affect overall operation of a system and the processes such systems implement. It may be the case where despite different configuration settings, two systems are still configured to implement the same processes. Thus, merely comparing configuration settings by themselves will not yield an adequate comparison when the goal is comparing overall system operation at a process level.

DETAILED DESCRIPTION

Figure 1:
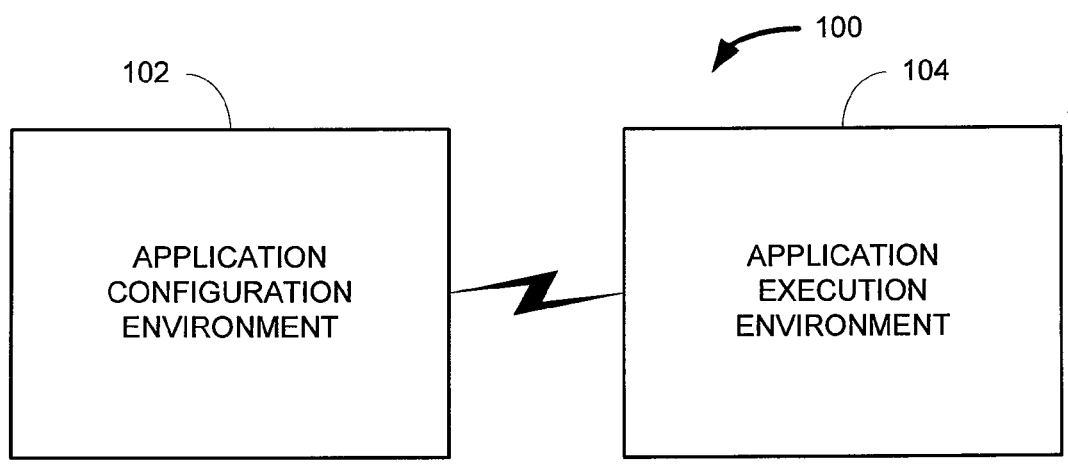
FIG. 1 is a block diagram of a system according to an example embodiment.

Various embodiments herein include one or more of systems, methods, software, and data structures operable to perform or assist in performing system configuration comparison to identify process variation. Some of these embodiments allow for comparison of configurations between two or more computer applications, such as Enterprise Resource Planning ("ERP") application. Such comparisons, in some embodiments, may be performed at one or more granularities. For example, data representative of configuration settings may be extracted from each computer application to be compared and then abstracted to representations of processes configured in the systems. The process representations between the applications may then be compared to yield a report, or other output, indicative of differences at a process level. In some embodiments, configuration settings may be abstracted to a process representation by applying one or more of a filter and encoded logic to the data representative of the configuration settings. The filter, in some embodiments, is referred to herein as an adaptation catalog. In some embodiments, the data representative of configuration settings may data from which configuration settings are directly or indirectly derived. This data may include scoping information which is described in detail below.

These embodiments, and others, are described in detail below. In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, electrical, or other changes may be made without departing from the scope of the inventive subject matter. Such embodiments of the inventive subject matter may be referred to, individually and/or collectively, in the present application by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described in the present application are implemented in hardware, software or a combination of software and hardware in one or more embodiments. The software comprises computer executable instructions stored on computer readable media such as memory or other type of storage devices. The term "computer readable media" is also used to represent carrier waves on which the software is transmitted. Further, such functions correspond to modules, which may include one or a combination of software, hardware, or firmware. Multiple functions may be performed in one or more modules as desired, and the embodiments described are merely examples. The software may be executed on a digital signal processor, ASIC, microprocessor, or other type of processor operating on a system, such as a personal computer, server, a router, or other device capable of processing data including devices interconnected by a network.

Some embodiments implement the functions in two or more specific interconnected hardware modules or devices with related control and data signals communicated between and through the modules, or as portions of an application-specific integrated circuit. Thus, the exemplary process flows are applicable to software, firmware, and hardware implementations.

Some of the embodiments described herein include use of scoping information to identify processes and variants of processes implemented within systems to facilitate comparisons of systems. For these embodiments to be fully understood and appreciated, various elements of the system embodiments illustrated and described with regard to FIG. 2 and FIG. 3 are provided.

FIG. 1 is a block diagram of a system 100 according to an example embodiment. The system 100 includes an application configuration environment 102 and an application execution environment 104.

The application configuration environment 102 is a system 100 environment within which an application can be configured. However, the application will, or does, execute within the application execution environment 104. In some embodiments, this arrangement of the application configuration environment 102 and the application execution environment 104 separates the configuration of an application from the environment within which it executes. When an application configuration has been established, all or part of the configuration can then be deployed to the application execution environment 104. This deployment can occur to one or more separate instances of the application in the application execution environment 104. Although only a single application execution environment 104 is illustrated, multiple application execution environments 104 can exist, and the deployment can be made to one or more of the multiple application execution environments 104. In some embodiments, such as where there are application execution environments, the application instances need not be instances of the same application. In some embodiments, the application instances may be computer applications from different software development organizations that may be configured to provide essentially the same functionality. For example, ERP applications from different software development organizations where the computer applications each include human resources functionality.

Figure 2:
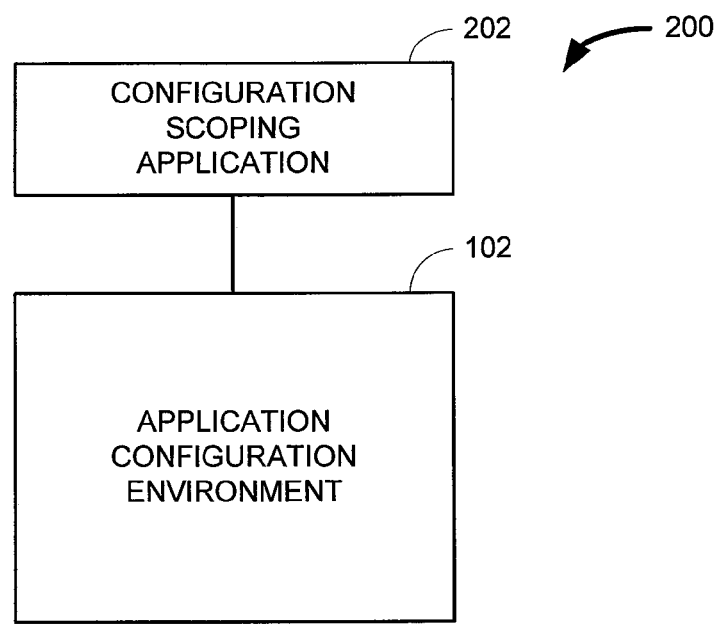
FIG. 2 is a block diagram of a system according to an example embodiment.
Figure 3:
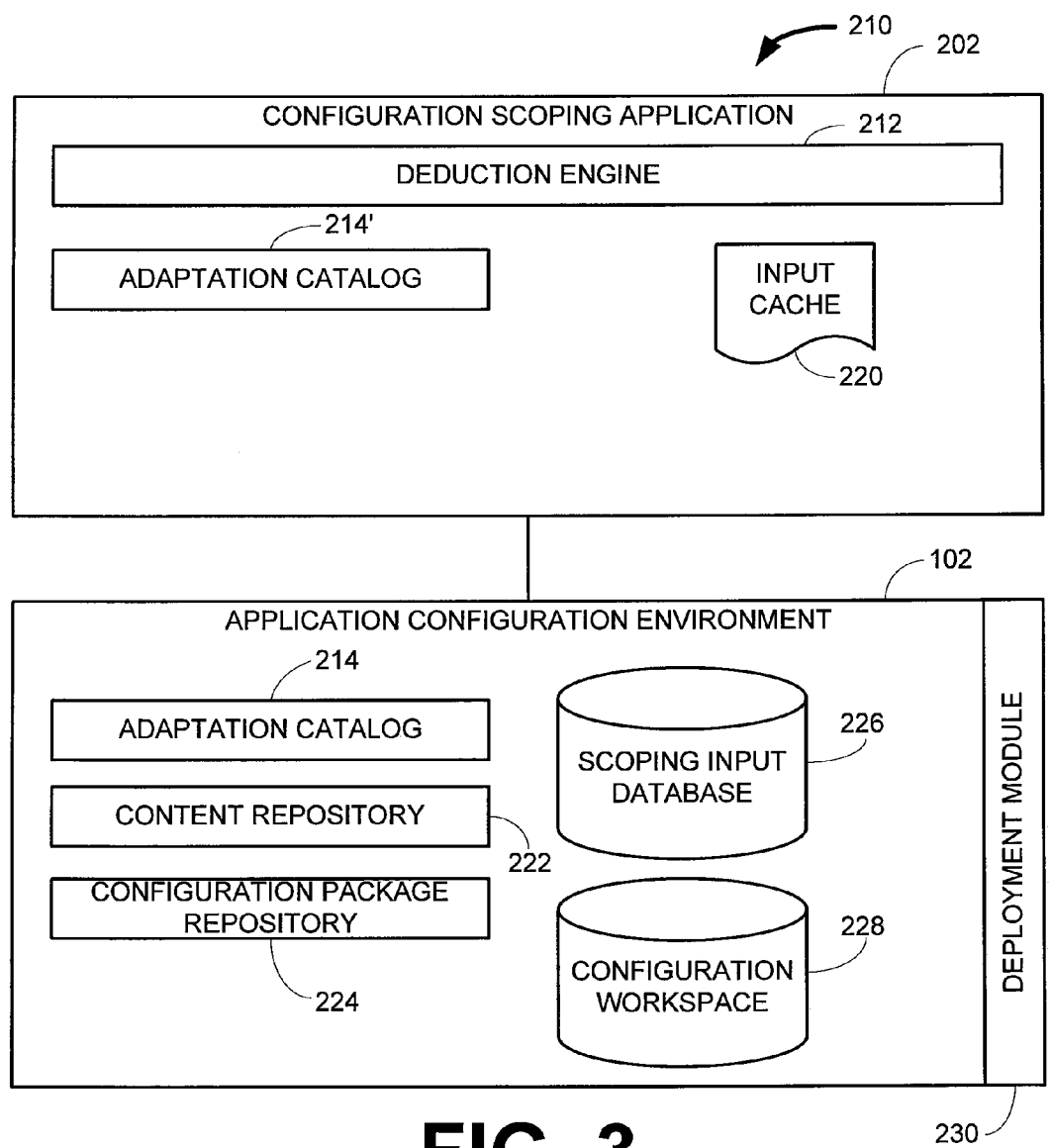
FIG. 3 is a block diagram of a system according to an example embodiment.

FIG. 2 is a block diagram of a system 200 according to an example embodiment. The system 200 includes a configuration scoping application 202 and the application configuration environment 102.

The configuration scoping application 202 typically is a software tool that executes on a computing device, such as a portable computer, on a same computing device within which the application configuration environment 102 exists, or on another computing device that can be communicatively coupled to the application configuration environment 102.

The configuration scoping application 202, when executed, typically presents a set of scoping questions to a user. The scoping questions are linked to one of many adaptation catalog entries. The adaptation catalog entries include a representation of all of the solution capabilities of an application to be configured, and eventually executed. In some embodiments, the solution capabilities are hierarchically divided into areas, packages, topics, and options. There may be multiple areas and each area may have multiple packages. Each package may have multiple topics and each topic may have multiple options.

In some embodiments, such as in an example embodiment where the application to be configured is an ERP application, the adaptation catalog may provide in the area Sales, a package Customer Order Management that contains the topics Sales Order Quote, Sales Order, Sales Order Analysis, and others. On that level, one or more options typically exist such as Approval Processing.

In the configuration scoping application 202, as stated above, each scoping question may be linked to an adaptation catalog entry. An adaptation catalog entry further includes a rule. These rules may be used to model dependencies between the areas, packages, topics, and options and corresponding solution capabilities of the application. A rule may specify required inclusion or exclusion of other areas, packages, topics, or options, or may require specification of further areas, packages, topics, or options. A rule may also specify a recommendation or default area, package, topic, or option.

For example, a first example scoping question, "What is the primary focus of your business?" may have three possible answers including "Sales," "Service," and "Logistics." Such a first scoping question typically is aimed at identifying an area of business in which the application is going to be used. Answering "Sales" typically tells the configuration scoping application 202 that the area is "Sales" and a rule tied to the adaptation catalog entry for "Sales" specifies dependencies with packages, topics, and options and the corresponding solution capabilities of the application necessary or optional in using the application in a sales business. Such a rule can also specify that other packages, topics, and options and the corresponding solution capabilities be excluded.

Thus, when a user answers scoping questions, the configuration of the application is being performed.

FIG. 3 is a block diagram of a system 210 according to an example embodiment. The system 210 includes the configuration scoping application 202 and the application configuration environment 102.

The configuration scoping application 202, in some embodiments, includes a deduction engine 212, and an adaptation catalog 214'. In this embodiment, the configuration scoping application 202 may further include an input cache 220.

The application configuration environment 102, in some embodiments, includes an adaptation catalog 214, a content repository 222, and a configuration package repository 224. In some such embodiments, the application configuration environment further includes a scoping input database 226, a configuration workspace 118, and a deployment module 230.

The adaptation catalog 214 may include a representation of all of the solution capabilities of an application to be, or already, configured, and eventually executed. Each capability of an application is typically identified in an adaptation catalog 214 entry. These abilities, alone or in combination, are often indicative of processes. The adaptation catalog 214 entries each may be identified as an area, package, topic, or option and may be organized in a hierarchy with a child identifying the parent. An example hierarchy is a "General Ledger" capability, which in some embodiments is a package having two topics, "cash based" and "accrual based" which may be two application capabilities within the "General Ledger" capability. Such capabilities as the "cash based," "accrual based," and "General Ledger" capabilities are interchangeably referred to herein as processes, such as processes that may or may not be implemented in one or more of the system configurations being compared.

The adaptation catalog 214 entries, in some embodiments, may further include scoping questions directed toward obtaining scoping information to determine what areas, packages, topics, and options are relevant to the user's needs. Additionally, the adaptation catalog entries typically include rules, the application of which can require inclusion or exclusion, or specify default inclusion or exclusion, of certain other areas, packages, topics, and options. Thus, because the areas, packages, topics, and options correlate to application capabilities, the inclusion, exclusion, and defaulting specifies what capabilities will be, or are, enabled and disabled in the application when deployed.

In some embodiments, rules and entries in the adaptation catalog can be linked to a configuration package that may exists in the configuration package repository 224 within the application configuration environment 102 or may be obtained for implementing various system capabilities, functionality, processes, and the like. A configuration package includes one or more configuration settings that enable or disable functionality of the application when deployed, such as approval, shipping, taxation, and other elements.

In one embodiment, rules are applied by the deduction engine 212 of the configuration scoping application 202. The configuration scoping application 202 typically presents a user interface that requests answers to questions that may be identified by the deduction engine 212 based on the adaptation catalog 214'. The adaptation catalog 214', in some embodiments, is a copy of the adaptation catalog 214 of the application configuration environment 102, or an equivalent thereof such as when there may be multiple different types of application execution environments from different software development organizations. When an answer is received by the configuration scoping application 202 through the user interface, the answer may be stored in the input cache 220 of the configuration scoping application 202. The deduction engine 212 may then applies the rule, if one exists, associated with the adaptation catalog 214' entry of the question asked to the received answer. Through the application of the rule, in view of answers already received and rules already applied, the deduction engine 212 may be configured to identify a next question to ask. The identified question typically is then presented to the user through the user interface. This process may be configured to continue until either all of the questions have been asked or the user is out of time, or the user otherwise chooses to stop. If questions remain that have not been answered, the process typically can be continued at a later time or rules may be configured to specify default areas, packages, topics, and options in order to supply enough information to allow deployment of the application in a functional form.

After the scoping question have been answered, the answers, and any other information obtained from a sales lead, administrator, or other user(s) of the configuration scoping application 202, the information typically is uploaded to the application configuration environment 102. However, in embodiments, where the configuration scoping application 202 executes on the same computing device as the application configuration environment 202, the scoping question answers and other information may be stored directly to the application configuration environment 102.

When the configuration question answers and other information is uploaded, or otherwise stored to the application configuration environment 102, the scoping question answers may be stored to a scoping input database 226. The scoping question answers, in some instances, will be referred to interchangeably as the "scoping information."

After the scoping information is within the scoping input database 226, or is subsequently modified, a process within the application configuration environment 102 can execute to begin configuring an application in the configuration workspace 228. The configuration workspace may include a set of configuration tables that mirrors, at least in part, the configuration tables of the application. In some embodiments, there may be multiple sets of configuration tables, such as a configuration table for each application instance that may subsequently be deployed. For example, if the scoping information is to be used to configure software systems from two or more different software application development organizations.

The process that configures the application, or applications, typically determines one or more configuration packages to instantiate in the configuration workspace 228. Configuration packages, in some embodiments, include one or a set of configuration settings to enable or disable certain capabilities of the application. Configuration packages, as mentioned above, can be linked to adaptation catalog 214 entries and rules associated with adaptation catalog entries. Thus, the process that configures the application in the configuration workspace 228 typically queries the scoping information in the scoping input database 226 to identify configuration packages to instantiate.

Once the configuration packages are instantiated, configuration settings made as part of instantiating the configuration packages may be fine-tuned to more closely match the intended processes of the system, or systems, under configuration will implement. Such fine-tuning may also include modifying other items such as sales order document templates to include a name, address, and logo of an enterprise.

After the application has been configured, or a configuration is modified, in the configuration workspace, the configuration typically is deployed by the deployment module 230. The deployment module 230 may be configured to deploy configuration settings to one or more baseline applications that have already been instantiated in one or more application execution environments. In some embodiments, the deployment module includes one or more processes such as a configuration setting deployment process, an activation process, and a data deployment process. The configuration setting deployment process typically copies configuration settings from configuration tables in the configuration workspace 228. The data deployment process may be configured to execute if there is demonstration data in the configuration workspace 228. If there is demonstration data, the data typically is copied from the configuration workspace 228 to application tables in the application execution environment. Some embodiments may also utilize the activation process to implement activation procedures which may be integrated with processes of a developer of the system to implement quality control, billing, testing, support, and other service related issues and functionality.

In some embodiments, the deployment module 230 further includes a delta deployment process that is relevant only after an application has already been deployed. When an application is deployed, or subsequently modified, the scoping information in the scoping input database 226 typically is updated. In some embodiments, the delta deployment process enables tracking of a current configuration of a deployed application. In embodiments including the delta deployment process, the scoping information typically is further tracked on a historical basis to at least allow a view of a current configuration and a modified configuration not yet deployed, if applicable. The delta deployment process may then use that historical tracking of the application configuration to identify changes between the current application configuration and the modified configuration not yet deployed. The delta deployment process in such embodiments will typically only deploy the changes to the application configuration.

Figure 4:
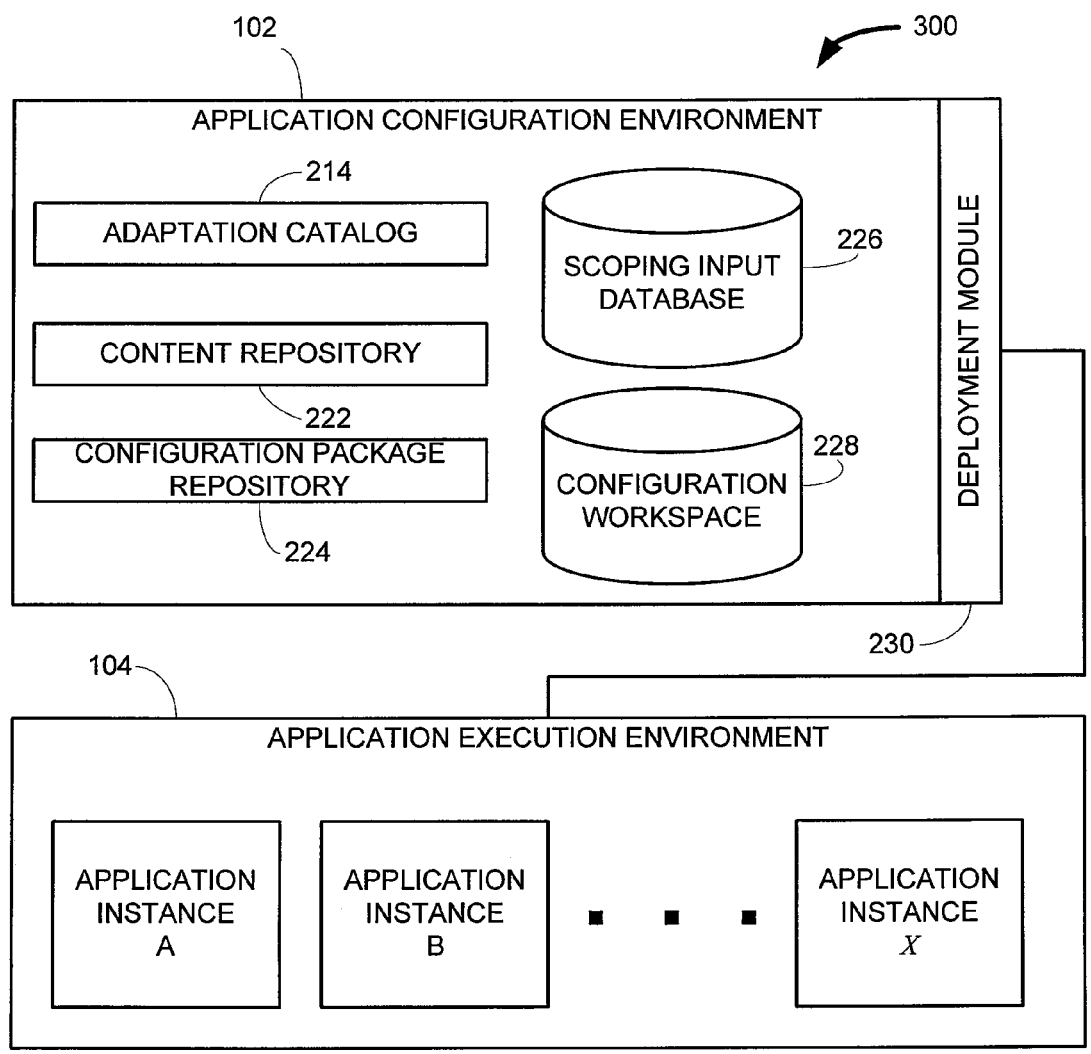
FIG. 4 is a block diagram of a system according to an example embodiment.

FIG. 4 is a block diagram of a system 300 according to an example embodiment. The system 300 may include the application configuration environment 102 as discussed above with regard to FIG. 1, FIG. 2, and FIG. 3. The system 300 further includes an application execution environment 104.

The application execution environment 104 is a data processing environment within which an application, or an application to be deployed, can execute. When deploying an application, the deployment module 230 needs to know what application execution environment 104 and what application instance within that environment to deploy to. In embodiments including only one application execution environment 104, the application execution environment 104 may already be known. Similarly, in an application execution environment including only a single application instance, the instance may already be known.

In the embodiment of FIG. 4, each instance of the application (i.e., application instances A, B, . . . X) typically includes a set of identical configuration tables which can include distinct configuration settings from one another. In some embodiments, multiple instances of the application exist to provide a development instance, a test instance, and a production instance. In such embodiments where there are multiple application instances, the deployment module 230 may be configured to deploy the configuration settings from one of the application instances in the application execution environment 104 to another application in the same or another application execution environment 104. Although the deployment module 230 is illustrated as being a part of the application configuration environment 102, the deployment module 230, in other embodiments, can be a standalone application or a part of another application or process.

Figure 5:
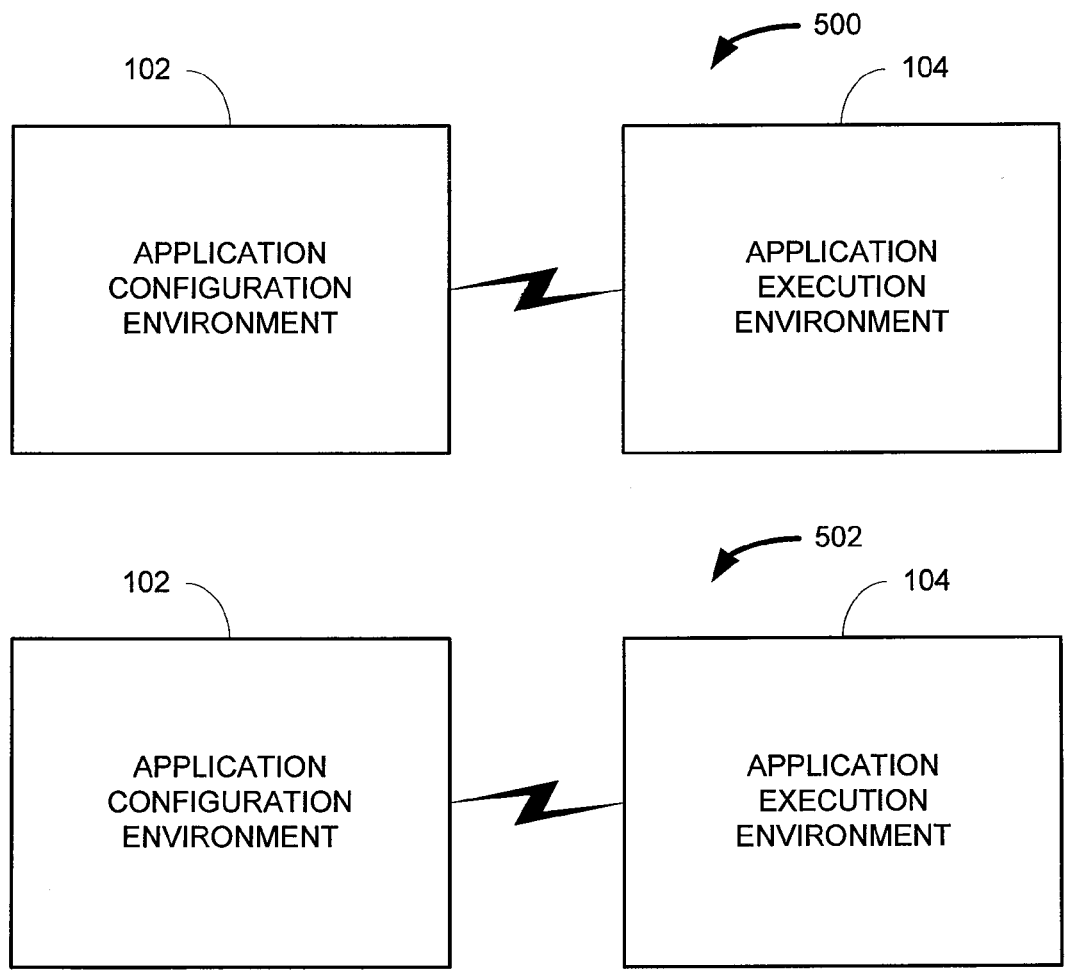
FIG. 5 is a block diagram of two systems according to an example embodiment.

FIG. 5 is a block diagram of two systems 500 and 502 according to an example embodiment. Both systems 500, 502 include an application configuration environment 102 and an application execution environment 104. Application instances deployed within the application execution environments 104 of both systems 500, 502 may be the same or different applications in various embodiments.

Figure 6:
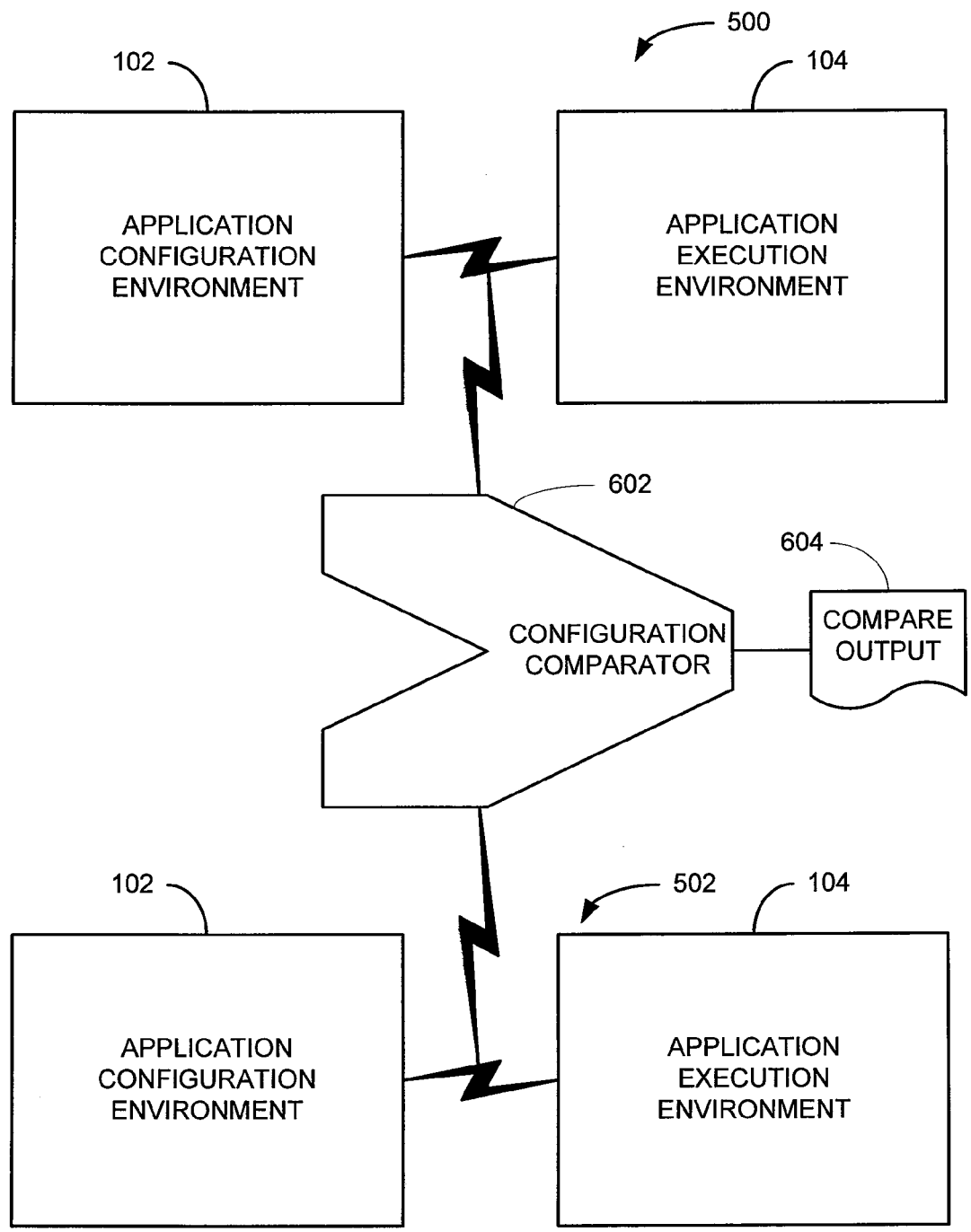
FIG. 6 is a block diagram of a configuration comparator according to an example embodiment.

FIG. 6 is a block diagram of a configuration comparator 602 according to an example embodiment. The illustration of FIG. 6 also includes the systems 500 and 502 of FIG. 5 as an example of interconnections between the configuration comparator 602 and the systems 500 and 502. The configuration comparator 602 is operable to compare configurations of application instances deployed in the application execution environments 104. The configuration comparator 602, in some embodiments, is operable to perform a functional comparison of the application instance configurations rather than a simple application configuration setting comparison. As a result, configuration settings that do not influence how processes operate can be eliminated from the comparison. In such embodiments, output 604 of the comparison can be quickly assessed to identify significant system configuration differences at a process level.

In some embodiments, the configuration comparator 602 may retrieve configuration information from each of the systems 500, 502 to be compared. The configuration information may include one or more of scoping information stored in the application configuration environments 102, configuration settings of application instances from either the application execution environments 104 or application configuration environments 102, adaptation catalogs from the application configuration environments 102, and other data from these or other sources including a memory device of a computing device upon which the application comparator 602 executes. The configuration information of each system 500, 502 is then abstracted using one or both of a filter, such as an adaptation catalog, and logic to identify processes implemented in each system. The comparator may then compare the processes between the systems and generate a compare output 604. The compare output 604 may be stored for later retrieval, presented to a user via a display device, sent in a message to an interested system or message box or device of an interested person, or presented and communicated in other ways.

Figure 7:
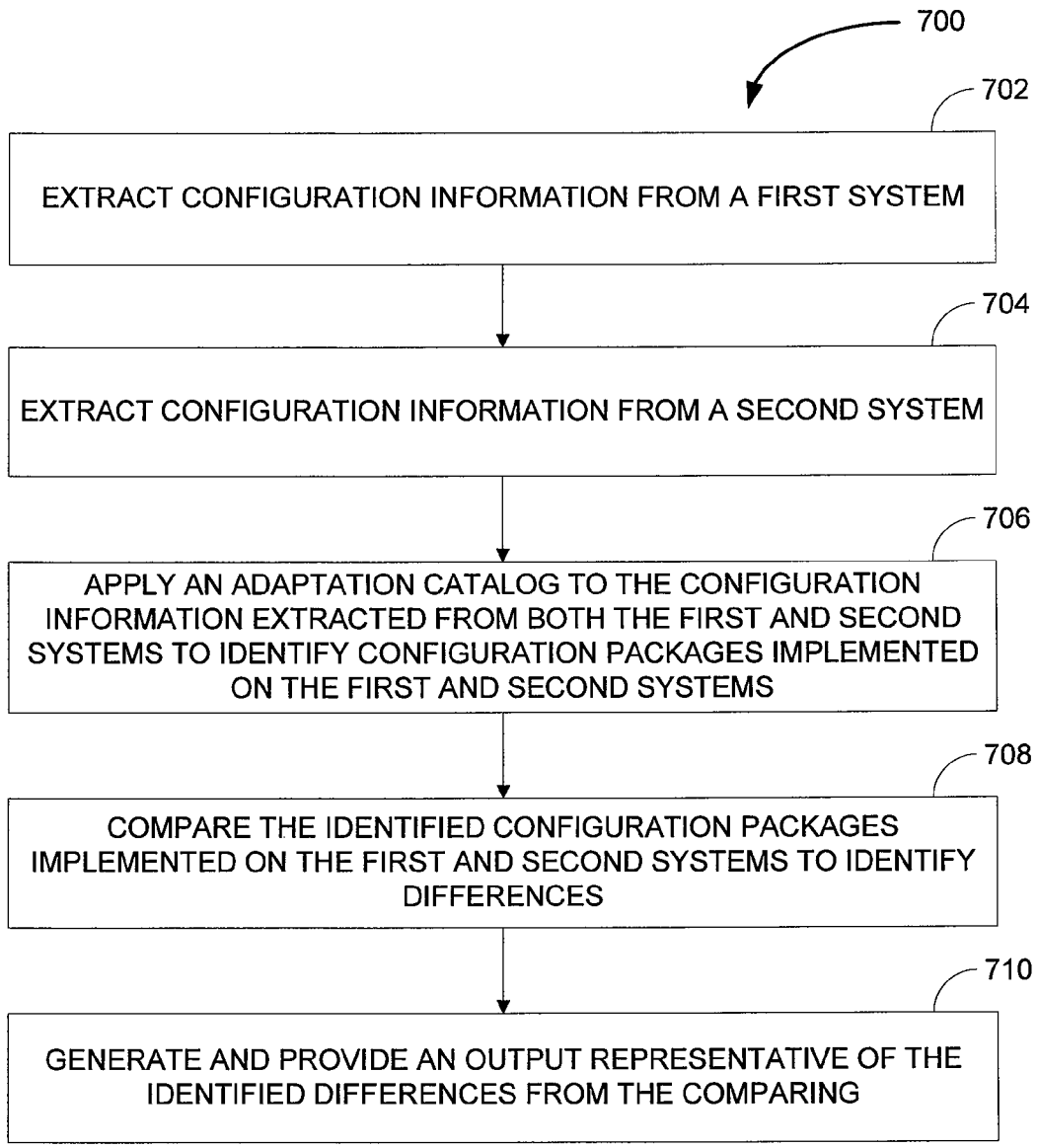
FIG. 7 is a block flow diagram of a method according to an example embodiment.

FIG. 7 is a block flow diagram of a method 700 according to an example embodiment. The method 700 may be performed by the configuration comparator 602 as discussed above with regard to FIG. 6 or by another computing device. The method 700 includes extracting 702 configuration information from a first system and extracting 704 configuration information from a second system. The method 700 further includes applying 706 an adaptation catalog to the configuration information extracted from both the first and second systems to identify configuration packages implemented on the first and second systems and comparing 708 the identified configuration packages implemented on the first and second systems to identify differences. The method 700 then generates and provides 710 an output representative of the identified differences from the comparing 709.

In some embodiments, the configuration information includes data representative of scoping information. The configuration information may further include data representative of fine-tuning of configuration packages and configuration settings. The comparing 708 may further include comparing the data representative of the fine-tuning of the configuration packages and configuration settings between the first and second systems to identify differences.

In some embodiments, the comparing 708 of configuration packages is performed to identify process variations between the first and second systems. The first and second systems may be separate instances of a single computer application, although in other embodiments, the first and second systems are different computer applications. In some embodiments, applying 706 an adaptation catalog to the configuration information extracted from both the first and second systems includes applying one or more adaptation catalogs specific to the computer applications of the respective systems.

Figure 8:
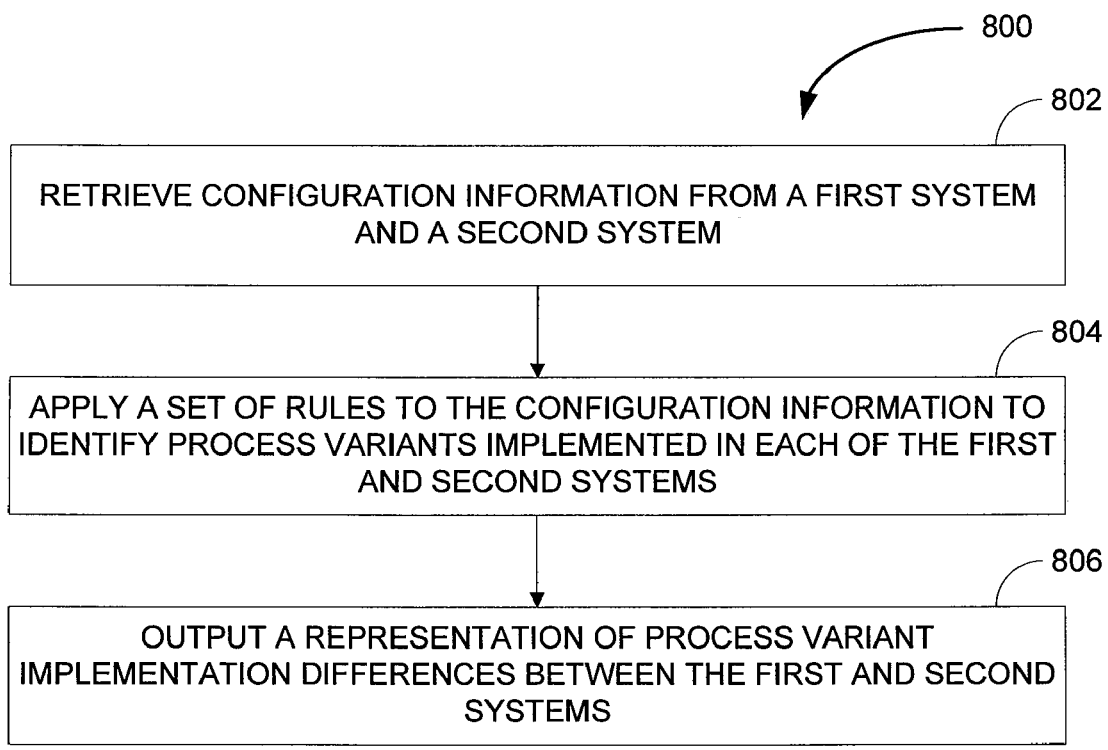
FIG. 8 is a block flow diagram of a method according to an example embodiment.

FIG. 8 is a block flow diagram of a method 800 according to an example embodiment. The method 800 may be performed by the configuration comparator 602 as discussed above with regard to FIG. 6 or by another computing device. The method 800 includes retrieving 802 configuration information from a first system and a second system and then applying 804 a set of rules to the configuration information to identify process variants implemented in each of the first and second systems. Identifying process variants may include transforming the configuration settings into representations of processes, such as by using one or more configuration setting filters, logic statements to evaluate one or more configuration settings and or scoping information, coded or retrieved default values associated with application types of the first and second system, and other identification methods depending on the particulars of the specific embodiment. In some embodiments, applying 804 the set of rules to the configuration information to identify process variants includes applying rules defined in one or more adaptation catalogs. Once the process variants have been compared and the differences identified, the method 800 further includes outputting 806 a representation of process variant implementation differences between the first and second systems.

As mentioned previously, configuration information may include one or more of data representative of one or more of scoping information, fine-tuning information, and configuration settings.

Figure 9:
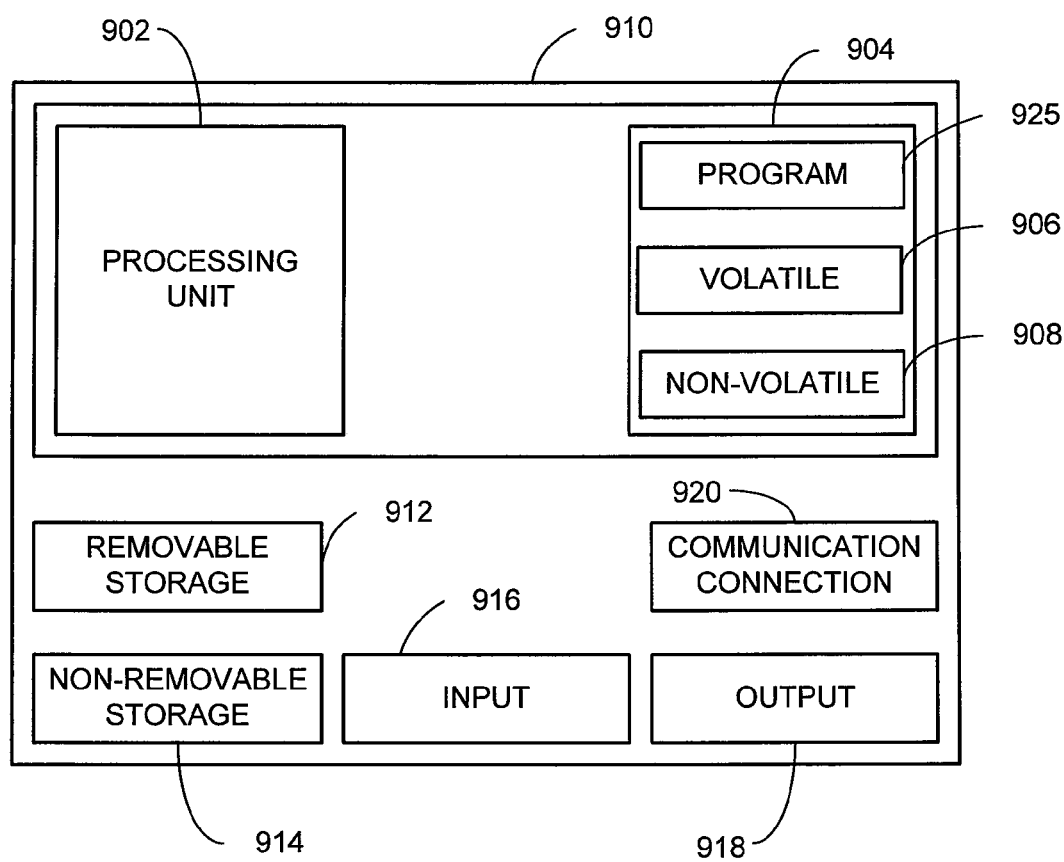
FIG. 9 is a block diagram of a computing system according to an example embodiment.

FIG. 9 is a block diagram of a computing system according to an example embodiment. In one embodiment, multiple such computer systems are utilized in a distributed network to implement multiple components in a transaction-based environment. An object-oriented architecture may be used to implement such functions and communicate between the multiple systems and components. One example computing device in the form of a computer 910, may include a processing unit 902, memory 904, removable storage 912, and non-removable storage 914. Memory 904 may include volatile memory 906 and non-volatile memory 908. Computer 910 may include—or have access to a computing environment that includes—a variety of computer-readable media, such as volatile memory 906 and non-volatile memory 908, removable storage 912 and non-removable storage 914. Computer storage typically includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 910 may include or have access to a computing environment that includes input 916, output 918, and a communication connection 920. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 902 of the computer 910. A hard drive, CD-ROM, and RAM are some examples of articles including a computer-readable medium. For example, a computer program 925 capable of implementing one or more the methods described herein. Further, a the computer program 925 may implement the application configuration environment 102, application execution environment 104, the configuration scoping application 202, or an ERP application as described and illustrated with regard to the other figures herein.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
    extracting configuration information from a first system;
    extracting configuration information from a second system;
    applying an adaptation catalog to the configuration information extracted from both the first and second systems to identify configuration packages implemented on the first and second systems;
    comparing the identified configuration packages implemented on the first and second systems to identify differences; and
    generating and providing an output representative of the identified differences from the comparing.

2. The method of claim 1, wherein the configuration information includes data representative of scoping information.

3. The method of claim 2, wherein:
    the configuration information further includes data representative of fine-tuning of configuration packages and configuration settings; and
    the comparing further includes comparing the data representative of the fine-tuning of the configuration packages and configuration settings between the first and second systems to identify differences.

4. The method of claim 1, wherein the comparing of configuration packages identifies process variations between the first and second systems.

5. The method of claim 1, wherein the first and second systems are separate instances of a single computer application.

6. The method of claim 5, wherein the computer application is an enterprise resource planning computer application.

7. The method of claim 1, wherein the first and second systems are different computer applications.

8. The method of claim 7, wherein applying an adaptation catalog to the configuration information extracted from both the first and second systems includes applying one or more adaptation catalogs specific to the computer applications of the respective systems.

9. A computer-readable medium, with instructions thereon, which when processed, cause a computer to:
    retrieve configuration information from a first system and a second system;
    apply a set of rules to the configuration information to identify process variants implemented in each of the first and second systems; and
    output a representation of process variant implementation differences between the first and second systems.

10. The computer-readable medium of claim 9, wherein the configuration information includes data representative of one or more of scoping information, fine-tuning information, and configuration settings.

11. The computer-readable medium of claim 9, wherein the applying the set of rules to the configuration information to identify process variants includes applying rules defined in one or more adaptation catalogs.

12. The computer-readable medium of claim 9, wherein the first and second systems are separate instances of the same computer application.

13. The computer-readable medium of claim 9, wherein the first and second systems are different computer applications.

14. The computer-readable medium of claim 13, wherein applying the set of rules to the configuration information to identify process variants implemented in each of the first and second systems includes applying one or more adaptation catalogs specific to the computer applications of the respective systems.

15. A system comprising:
    a network interface;
    a processor;
    a memory device including instructions stored thereon that are operable on the processor to cause the system to:
        retrieve, over the network interface, configuration information from a first system and a second system;
        apply a set of rules to the configuration information to identify process variants implemented in each of the first and second systems; and
        output a representation of process variant implementation differences between the first and second systems.

16. The system of claim 15, wherein the configuration information includes data representative of one or more of scoping information, fine-tuning information, and configuration settings.

17. The system of claim 15, wherein the applying the set of rules to the configuration information to identify process variants includes applying rules defined in one or more adaptation catalogs.

18. The system of claim 15, wherein the output representation is stored in the memory device and is displayable on a monitor coupled to the system.

19. The system of claim 9, wherein the first and second systems are different computer applications.

20. The system of claim 19, wherein applying the set of rules to the configuration information to identify process variants implemented in each of the first and second systems includes applying one or more adaptation catalogs specific to the computer applications of the respective systems.

* * * * *